United States Patent
Santo

(10) Patent No.: US 12,131,091 B2
(45) Date of Patent: Oct. 29, 2024

(54) IMAGE PROCESSING DEVICE, METHOD FOR CONTROLLING IMAGE PROCESSING DEVICE

(71) Applicant: CANON KABUSHIKI KAISHA, Tokyo (JP)

(72) Inventor: Hideki Santo, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/339,613

(22) Filed: Jun. 22, 2023

(65) Prior Publication Data

US 2023/0333796 A1    Oct. 19, 2023

Related U.S. Application Data

(63) Continuation of application No. PCT/JP2021/037685, filed on Oct. 12, 2021.

(30) Foreign Application Priority Data

Dec. 28, 2020   (JP) .................................. 2020-219309
Dec. 28, 2020   (JP) .................................. 2020-219359

(51) Int. Cl.
*G06F 3/14*         (2006.01)
*G06F 3/04845*      (2022.01)
(Continued)

(52) U.S. Cl.
CPC ............ *G06F 3/14* (2013.01); *G06F 3/04845* (2013.01); *G06T 3/60* (2013.01); *G06T 5/50* (2013.01); *G06T 2207/20221* (2013.01)

(58) Field of Classification Search
None
See application file for complete search history.

(56) References Cited

U.S. PATENT DOCUMENTS

2016/0330383 A1*  11/2016  Oyama ................ H04N 23/741
2017/0034237 A1*  2/2017   Silver .................... H04N 5/272
(Continued)

FOREIGN PATENT DOCUMENTS

JP      2000-165718 A     6/2000
JP      2004-214925 A     7/2004
(Continued)

OTHER PUBLICATIONS

The above documents were cited in an International Search Report issued on Jan. 11, 2022 a copy of which is enclosed, that issued in PCT Application No. PCT/JP2021/037685.

*Primary Examiner* — Duane N Taylor, Jr.
(74) *Attorney, Agent, or Firm* — Cowan, Liebowitz & Latman, P.C.

(57) ABSTRACT

An image processing device includes a first generation unit, a second generation unit, and a control unit. The first generation unit controls a direction of a first image according to a first setting that is a setting for processing of rotation or inversion to generate a second image. The second generation unit controls a direction of the second image according to a second setting that is a setting for processing of rotation or inversion to generate a third image. The control unit 1) controls a display unit to display the third image, and 2) controls the direction of the second image so as to cancel control by the first generation unit to control the second generation unit so that a fourth image is generated and controls the display unit so that the fourth image is displayed regardless of the second setting in response to a first trigger.

22 Claims, 8 Drawing Sheets

(51) Int. Cl.
*G06T 3/60* (2024.01)
*G06T 5/50* (2006.01)

(56) References Cited

U.S. PATENT DOCUMENTS

| | | | |
|---|---|---|---|
| 2019/0281233 A1* | 9/2019 | Yorozu | G03B 17/18 |
| 2020/0314337 A1* | 10/2020 | Matsushima | H04N 23/62 |
| 2022/0369897 A1* | 11/2022 | Ubbesen | A61B 1/00045 |

FOREIGN PATENT DOCUMENTS

| | | | |
|---|---|---|---|
| JP | 2015-029208 A | 2/2015 | |
| JP | 2015-029227 A | 2/2015 | |

\* cited by examiner

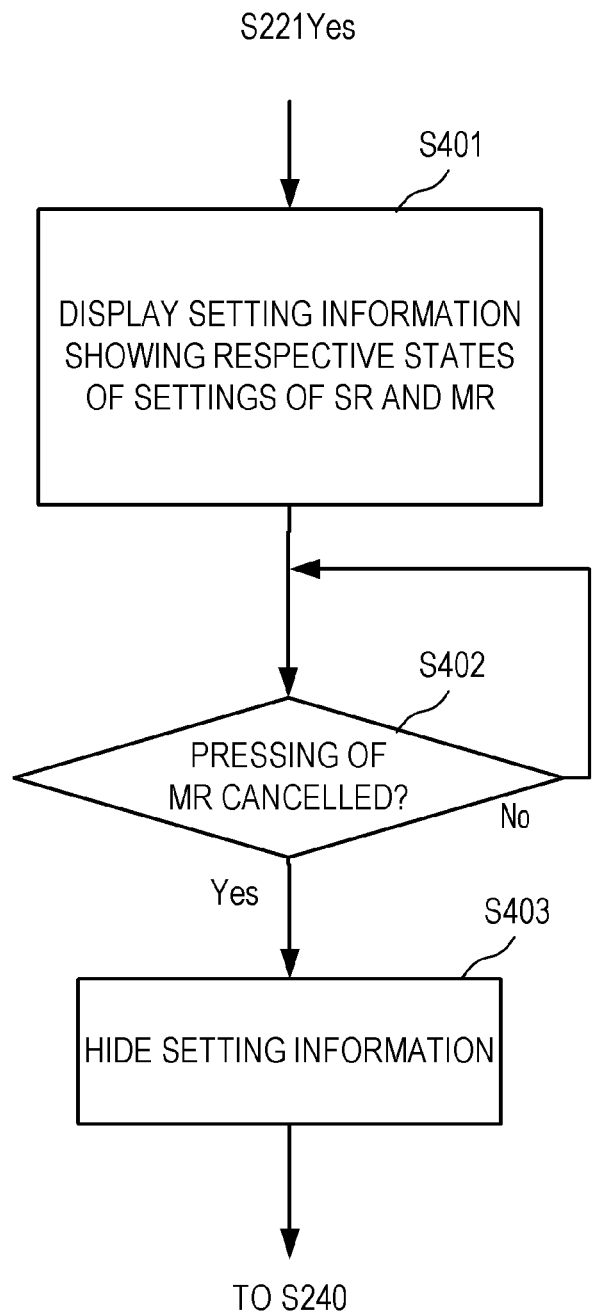

IMAGE PROCESSING DEVICE, METHOD FOR CONTROLLING IMAGE PROCESSING DEVICE

CROSS-REFERENCE TO RELATED APPLICATIONS

This application is a Continuation of International Patent Application No. PCT/JP2021/037685, filed Oct. 12, 2021, which claims the benefit of Japanese Patent Application No. 2020-219309, filed Dec. 28, 2020 and Japanese Patent Application No. 2020-219359, filed Dec. 28, 2020, all of which are hereby incorporated by reference herein in their entirety.

BACKGROUND OF THE INVENTION

Field of the Invention

The present invention relates to an image processing device enabling the setting of rotation processing or inversion processing for each of images to be recorded and images to be displayed.

Background Art

Some cameras can be installed on ceilings with their bodies. Further, some cameras can perform photographing only with their display devices (devices for monitoring photographed images) installed at free places or in free directions. Therefore, according to installed positions of camera bodies, images (video) desired to be photographed, or confirmation contents on display devices, some cameras can horizontally, vertically, and vertically and horizontally invert each of images to be recorded (recording images) and images (display images) to be displayed on the display devices. That is, there have been cameras with the two types of functions of a recording-image inversion function (function of setting inversion processing to images to be recorded) and a display-image inversion function (function of setting inversion processing to display images).

Further, PTL 1 proposes a digital camera enabling a setting for horizontally inverting an image to be recorded during recording and a setting for horizontally inverting an image to be reproduced during reproduction. In PTL 1, the digital camera inverts a captured image to generate a recording image. Then, the digital camera inverts the recording image to generate a display image, and displays the generated display image.

CITATION LIST

Patent Literature

PTL 1 Japanese Patent Application Laid-open No. 2015-29208

SUMMARY OF THE INVENTION

Meanwhile, with the two functions, the same image is visually recognized on a display device, for example, when normal rotation (non-inversion) is set to a recording image and a display image to be displayed on the display device and when horizontal inversion is set to the recording image and the display image. Therefore, a user cannot grasp a current setting state from an image on the display device. In addition, even if the user makes an attempt to confirm the current setting state by restoring the two functions to initial settings, the confirmation is difficult due to an output from an external monitor or a change in the recording image.

In order to address this problem, it has been proposed that the digital camera of PTL 1 notifies the type of inversion during recording and the type of inversion during reproduction by the constant display of an icon during image reproduction based on a recorded image.

However, in PTL 1, the type of inversion during recording and the type of inversion during reproduction are collectively notified by the display of one icon, and therefore a user has a difficulty in intuitively grasping an inversion situation. In addition, PTL 1 only discloses the constant display of an inversion situation during reproduction. That is, PTL 1 considers only the setting state of the direction of an image during reproduction, and does not consider the setting state of the direction of an image to be recorded in preparation for photographing or at a photographing stage (before recording or during recording). Note that the above describes the inversion of an image but a similar problem occurs in the rotation of an image.

In view of the above problems, the present invention has an object of providing an image processing device that enables a user to intuitively recognize the inversion or rotation state of a recording image and a display image before or during the recording of an image.

For achieving the object of innovation, an image processing device including at least one memory and at least one processor which function as: a first generation unit configured to control a direction of a first image according to a first setting that is a setting for processing of rotation or inversion to generate a second image; a second generation unit configured to control a direction of the second image according to a second setting that is a setting for processing of rotation or inversion to generate a third image; and a control unit configured to 1) control a display unit to display the third image, and 2) control the second generation unit so that the direction of the second image is controlled to cancel control by the first generation unit and to generate a fourth image, and control the display unit to display the fourth image, in response to a first trigger regardless of the second setting.

According to the present invention, a user can intuitively recognize the inversion or rotation state of a recording image and a display image before or during the recording of an image.

BRIEF DESCRIPTION OF THE DRAWINGS

FIGS. 4A to 4D are diagrams for describing the photographing-mode processing of the imaging device according to a second embodiment.

DESCRIPTION OF THE EMBODIMENTS

Figure 1:
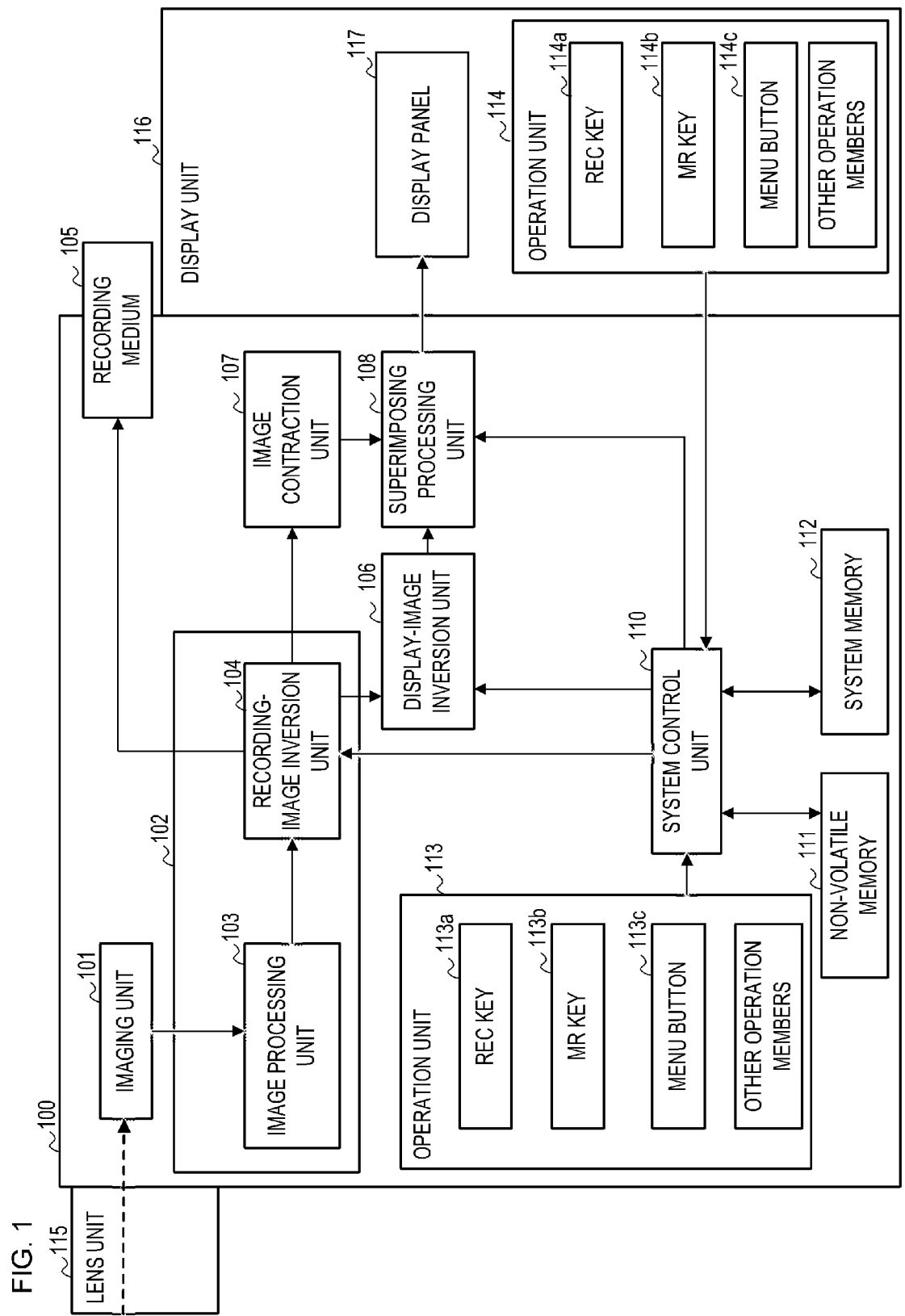
FIG. 1 is a block diagram showing the configurations of an imaging device according to a first embodiment.

Hereinafter, preferred embodiments of the present invention will be described in detail on the basis of the accompanying drawings.

First Embodiment

A first embodiment will describe an example of an imaging device (image processing device) that can invert an image (video) during recording and display. More specifically, the imaging device enabling the settings of recording-image inversion (inversion of the direction of an image during recording) and display-image inversion (inversion of the direction of an image during display) will be described. Further, the imaging device displays, by controlling the display-image inversion while maintaining the setting of the recording-image inversion, an image before the reflection of the settings of the recording-image inversion and the display-image inversion so as to be confirmable.

[About Scan Reverse (SR) and Mirror Reverse (MR)]

First, a scan-reverse (hereinafter called "SR") function serving as a recording-image inversion function and a mirror-reverse (hereinafter called "MR") function serving as a display-image inversion function that are settable in the imaging device according to the present embodiment will be described. Note that the "reflection of the setting of the MR or SR" will hereinafter refer to the execution of processing according to the setting. Further, the "cancellation of the setting of the MR or SR" will refer to the execution of processing in defiance of the setting.

The SR is an inversion function (recording-direction setting function) for a recording image. According to the SR, the conversion of a direction from an image before processing (during imaging) to a recording image to be recorded on a recording medium can be set to any of normal rotation, horizontal inversion, vertical inversion, and vertical and horizontal inversion. In the present embodiment, a user may set any of non-inversion (normal rotation), horizontal inversion, vertical inversion, and vertical and horizontal inversion in advance as the setting of the SR on a setting menu screen. A horizontally-inverted image is a mirror image in which a vertical relationship remains the same as an image before processing and right and left sides are inverted. A vertically-inverted image is a mirror image in which a horizontal relationship remains the same as an image before processing and upper and lower sides are inverted (mirror image when only the upper and lower sides are inverted). A vertically-and-horizontally-inverted image is an image in which both upper and lower sides and right and left sides are inverted, and equivalent to an image obtained by rotating an image before processing by 180 degrees. Therefore, vertical and horizontal inversion processing may be rephrased as 180-degree rotation processing.

The SR is used in, for example, a case where photographing is performed with an imaging device (camera) itself turned upside down or a case where an intentionally-inverted image is desired to be recorded. The case where photographing is performed with the imaging device turned upside down includes, for example, a case where the imaging device is anchored to a ceiling of a studio or a crane through a screw hole or the like provided in the bottom of the imaging device, or the like. The case where an intentionally-inverted image is desired to be recorded includes, for example, a case where a horizontally-inverted mirror image is recorded as a dance choreographic image, or the like. These cases are given as examples, and the intended use of the SR is various depending on users or photographing scenes. Inversion processing reflecting the setting of the SR is performed by a recording-image inversion unit 104 that will be described later.

The MR is an inversion function (display-direction setting function) for a display image. According to the MR, the conversion of a direction from an image before processing (during recording) to a display image (image displayed on a display (a display panel 117 of a display unit 116 that will be described later) for confirming a captured image) can be set to any of normal rotation, horizontal inversion, vertical inversion, and vertical and horizontal inversion. In the present embodiment, the setting of the MR is sequentially switched and set to any of the no inversion, horizontal inversion, vertical inversion, and vertical and horizontal inversion every time an MR key 113b or 114b is pressed (pressed in a short period of time) by the user.

Here, the display unit 116 that will be described later is attachable and detachable, and has a plurality of positions at which the display unit 116 can be attached to a body unit 100 that will be described later. Accordingly, the direction of the display unit 116 can be freely determined by the user. In addition, a direction in which the user visually recognizes the display unit 116 changes depending on the direction of the body unit 100. Accordingly, the user can perform the setting of the MR to make an image easily viewable according to the direction of the display unit 116 to the user or the purpose of confirming the image.

For example, in a case where the user sees the display unit 116 upside down, he/she can make the display unit 116 easily viewable by setting the MR to vertical and horizontal inversion. Further, in a case where the display surface of the display unit 116 is directed to a subject side in order to show an image on the subject side, a mirror image is easily viewable. Therefore, in this case, the user can make the image easily viewable by setting the MR to horizontal inversion or vertical inversion. Inversion processing reflecting the setting of the MR is performed by a display-image inversion unit 106 that will be described later.

[About Configuration of Imaging Device]

FIG. 1 is a block diagram showing the configurations of an imaging device (digital camera) as an example of the image processing device. The imaging device has the body unit 100, a lens unit 115, and the display unit 116.

The body unit 100 is the body of the imaging device. The body unit 100 has an imaging unit 101, a digital-signal processing unit 102, the display-image inversion unit 106, an image contraction unit 107, a superimposing processing unit 108, a system control unit 110, a non-volatile memory 111, a system memory 112, an operation unit 113, or the like.

The lens unit 115 is a photographing-lens group attachable to and detachable from the lens mount unit of the body unit 100. Subject light passes through the lens unit 115 and is guided to the imaging surface of the imaging unit 101.

The imaging unit 101 is an imaging element having a CCD element, a CMOS element, or the like that converts an optical image of a subject into an electric signal. The imaging unit 101 outputs an electric signal obtained by capturing an image of a subject to the digital-signal processing unit 102 as image data.

The digital-signal processing unit 102 has an image processing unit 103, a recording-image inversion unit 104, or the like. The digital-signal processing unit 102 performs signal processing or inversion processing of a recording image on image data that has been output from the imaging unit 101 to generate a recording image.

The image processing unit 103 performs resize processing such as predetermined pixel interpolation and contraction or color conversion processing on image data that has been received from the imaging unit 101 to generate an image signal (image). Further, the image processing unit 103 performs predetermined computation processing using image data of an image that has been captured by the imaging unit 101, and the system control unit 110 performs exposure control or ranging control on the basis of an obtained computation result. Thus, AF (Automatic Focus) processing of a TTL (Through-The-Lens) system, AE (Automatic Exposure) processing, or EF (Electronic Flash Pre-Emission) processing is performed.

The recording-image inversion unit 104 performs, on the basis of control by the system control unit 110, the control of the direction of an image signal (image; video) that has been processed by the image processing unit 103. More specifically, the recording-image inversion unit 104 performs processing (processing of any of no inversion (normal rotation), horizontal inversion, vertical inversion, and vertical and horizontal inversion) according to the setting of the SR on an image signal that has been processed by the image processing unit 103. A recording image that has been processed by the recording-image inversion unit 104 is output to a recording medium 105 and also output to the image contraction unit 107 and the display-image inversion unit 106. Note that in the present embodiment, the recording-image inversion unit 104 performs inversion processing on an image signal (an image) that has been processed by the image processing unit 103. However, the recording-image inversion unit 104 may realize inversion processing by changing the scan direction of an imaging sensor serving as the imaging unit 101.

The recording medium 105 is a recording medium (storage medium) such as a memory card attachable to and detachable from the body unit 100. Therefore, the recording medium 105 can be grasped as being included in the body unit 100 or can be grasped as being not included in the body unit 100. The recording medium 105 records a recording image that has been output from the recording-image inversion unit 104 as an image file (moving-image file if a moving image is output) in an image recording mode (during REC; predetermined operation mode). Further, the recording medium 105 may include an embedded memory (such as a semiconductor memory and a hard disk) capable of recording a recording image. Further, the recording medium 105 may include an external interface that outputs a recording image to an external recording medium (such as a hard disk drive).

The display-image inversion unit 106 generates a display image by controlling the direction of a recording image. Specifically, the display-image inversion unit 106 applies, on the basis of control by the system control unit 110, processing (any of non-inversion (normal rotation), horizontal inversion, vertical inversion, vertical and horizontal inversion) according to the setting of the MR to a recording image that has been received from the recording-image inversion unit 104. Then, the display-image inversion unit 106 outputs an image obtained by applying the processing according to the setting of the MR to the recording image to the superimposing processing unit 108 as a display image.

The image contraction unit 107 generates a contraction image by contracting a recording image that has been received from the recording-image inversion unit 104. The image contraction unit 107 outputs the generated contraction image to the superimposing processing unit 108.

The superimposing processing unit 108 superimposes a contraction image that has been output from the image contraction unit 107 or various display items such as setting information and icons on a display image from the display-image inversion unit 106 according to circumstances. The superimposing processing unit 108 outputs a display image on which a contraction image or display items have been superimposed or a display image on which the contraction image or the display items have not been superimposed to the display panel 117.

The system control unit 110 is a central processing unit that is in charge of the control of the entire imaging device and computation processing. The system control unit 110 is composed of at least one processor and/or at least one circuit. The system control unit 110 performs various control processing that will be described later by developing a program recorded on the non-volatile memory 111 into the system memory 112 and running the developed program.

The operation unit 113 is a unit including various operation members that receive operations from a user. When operations are performed on the respective units of the operation unit 113, the system control unit 110 is notified of operation contents and performs control according to the operations. The operation unit 113 includes at least an REC key 113a, an MR key 113b, a menu button 113c, and other operation members.

The REC key 113a is a press button for providing instructions to start or stop the recording of a moving image. The MR key 113b is a press button for switching the setting of the MR. The menu button 113c is a press button for displaying a setting menu screen for performing various settings on the imaging device. Operation members include, for example, a vertical and horizontal four-direction button, an SET button (determination button), a touch panel, a power switch, or the like. The user can determine (fix) any of a plurality of menu items included in a menu screen displayed on the display unit 116 by selecting the menu item using the vertical and horizontal four-direction button and pressing the SET button.

The display unit 116 has at least an operation unit 114 and a display panel 117. The display unit 116 is attachable to and detachable from the body unit 100. In addition, the display unit 116 is capable of communicating with the body unit 100 through wired or wireless communication. The display unit 116 is capable of receiving at least a display image (image signal) that is to be output from the superimposing processing unit 108 and transmitting (providing notification about) contents that have been operated on the operation unit 114 to the system control unit 110.

The display panel 117 is a display capable of displaying an image that has been captured by the imaging unit 101 or reproducing an image that has been recorded on the recording medium 105. The display panel 117 is composed of, for example, a liquid-crystal display panel or an organic EL panel. The display panel 117 displays a display image (image signal) that has been output from the display-image inversion unit 106 and then has passed through the superimposing processing unit 108.

The operation unit 114 is provided in the display unit 116, and is a unit including various operation members that receive operations from the user. When operations are performed on the respective units of the operation unit 114, the system control unit 110 is notified of operation contents and performs control according to the operations. The operation unit 114 includes an REC key 114a, an MR key 114b, a menu button 114c, and other operation members. The REC key 114a, the MR key 114b, and the menu button 114c are capable of performing the same operations as the REC key 113a, the MR key 113b, and the menu button 113c described above, respectively.

[About Photographing-Mode Processing]

Figure 2:
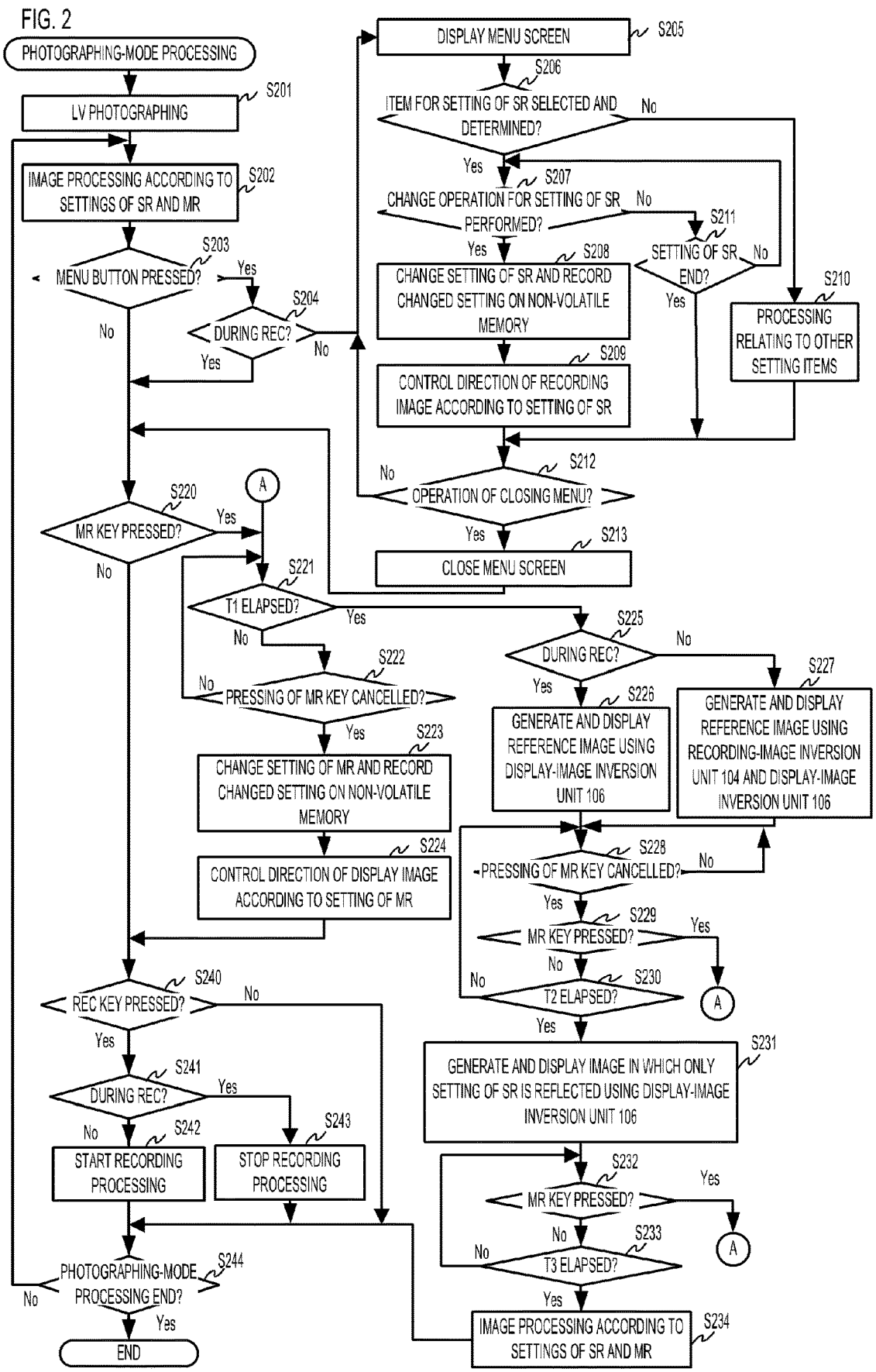
FIG. 2 is a flowchart of photographing-mode processing according to the first embodiment.

FIG. 2 shows the flowchart of photographing-mode processing by the imaging device (image processing device) shown in FIG. 1. The photographing-mode processing is realized when the system control unit 110 develops a program recorded on the non-volatile memory 111 into the system memory 112 and runs the developed program. Further, the photographing-mode processing starts when the power of the body unit 100 is turned on and a photographing mode is set.

In S201, the system control unit 110 starts live-view (hereinafter called LV) photographing with the imaging unit 101. In the present embodiment, the LV photographing refers to performing photographing while displaying an image captured by the imaging element of the imaging unit 101 on the display panel 117 in real time.

In S202, the system control unit 110 acquires the current settings of the SR and MR from the non-volatile memory 111. Then, the recording-image inversion unit 104 applies inversion processing to the LV image that has been photographed by the imaging unit 101 according to the setting of the SR, and the display-image inversion unit 106 applies inversion processing to the LV image according to the setting of the MR. Then, the system control unit 110 performs display control to display an image that "has been processed by the recording-image inversion unit 104 and the display-image inversion unit 106 and has been output from the superimposing processing unit 108" on the display panel 117. Thus, the system control unit 110 performs LV display (real-time display) of the photographed image.

In S203, the system control unit 110 determines whether the menu button 113c or 114c has been pressed. The processing proceeds to S204 when the menu button 113c or 114c has been pressed. Otherwise, the processing proceeds to S220.

In S204, the system control unit 110 determines whether a recording image (moving image) is being recorded (during REC; recording mode) on the recording medium 105. When a recording image is not being recorded, the processing proceeds to S205 to display a menu screen. On the other hand, the processing proceeds to S220 without displaying the menu screen when a recording image is being recorded. That is, in the present embodiment, the menu screen cannot be opened during REC, which prevents the setting of the SR from being changed. This aims to prevent the direction of a recording image from being changed during recording. Note that the setting of the SR may be changed during REC in a case where a change in the direction of a recording image is allowed during recording.

In S205, the system control unit 110 displays the menu screen for performing various settings on the display unit 28. The menu screen includes the menu items for the setting of the SR.

In S206, the system control unit 110 determines whether any of the menu items for the setting of the SR has been selected and determined according to a user operation (the menu item has been selected using the vertical and horizontal four-direction button and determined by the pressing of the SET button). The processing proceeds to S207 when the menu item for the setting of the SR has been selected and determined. Otherwise, the processing proceeds to S210.

In S207, the system control unit 110 displays a setting change screen for the setting of the SR and determines whether a setting different from the content of the current setting of the SR has been selected and determined according to a user operation (that is, whether a change operation for the setting of the SR has been performed). On the setting change screen for the setting of the SR, the four alternatives of no inversion (normal rotation), horizontal inversion, vertical inversion, and vertical and horizontal inversion described above are displayed as alternatives for the setting of the SR. The user can select and determine any of these alternatives using the four-direction key and the SET button. The processing proceeds to S208 when an alternative different from the content of the current setting of the SR has been selected and determined by the user (when the change operation for the setting of the SR has been performed). Otherwise, the processing proceeds to S211.

In S208, the system control unit 110 changes the setting of the SR to a setting (setting state; setting content) shown by the alternative that has been selected and determined in S207, and records the changed setting of the SR on the non-volatile memory 111.

In S209, the system control unit 110 controls the recording-image inversion unit 104 according to the current setting of the SR (the changed setting in S208) and controls (changes) the direction of a recording image output from the digital-signal processing unit 102. For example, when the setting of the SR is no inversion (normal rotation), the system control unit 110 performs control so as not to apply the inversion processing of the recording-image inversion unit 104 to an image signal (image) that has been output from the image processing unit 103. Alternatively, the system control unit 110 performs processing on the image signal (image) that has been output from the image processing unit 103 so as to be oriented in the direction of normal rotation by the recording-image inversion unit 104. Further, for example, when the setting of the SR is horizontal inversion, the system control unit 110 performs control so as to horizontally invert the image signal (image) that has been output from the image processing unit 103 by the recording-image inversion unit 104.

In S210, the system control unit 110 performs processing relating to other setting items. Other setting items include, for example, the setting of recording image quality (such as resolution, a compression rate, and a frame rate), the setting of auto focus (AF), or the like.

In S211, the system control unit 110 determines whether instructions to end the setting change screen for the setting of the SR has been provided. The processing proceeds to S212 when the instructions to end the setting change screen for the setting of the SR have been provided. Otherwise, the processing returns to S207.

In S212, the system control unit 110 determines whether the operation of closing the menu screen has been performed. The processing returns to S205 when the operation of closing the menu screen has not been performed. Otherwise, the processing proceeds to S213.

In S213, the system control unit 110 closes the menu screen and displays a live-view image (LV image) on the display panel 117. At this time, the system control unit 110 displays a display image generated by performing image processing according to the settings of the SR and MR on the display panel 117 as the LV image like S202.

In S220, the system control unit 110 determines whether the MR key 113b or 114b has been pressed. When the MR key 113b or 114b has been pressed, the system control unit 110 starts a timer to measure a time since the start of pressing the MR key. Then, the processing proceeds to S221 when the MR key 113b or 114b has been pressed. Otherwise, the processing proceeds to S240.

In S221, the system control unit 110 determines whether a time T1 has elapsed since the start of pressing the MR key (after the determination of Yes in S220). The time T1 is a time for discriminating whether the user has intentionally pressed the key for a long period of time (the user has not pressed the key for a short period of time), and is, for example, 3 seconds long. The processing proceeds to S225 when the time T1 has elapsed. Otherwise, the processing proceeds to S222.

In S222, the system control unit 110 determines whether the pressing of the MR key 113b or 114b has been cancelled. This determination is a determination as to whether the pressing has been cancelled (released) before the elapse of the time T1 in S221 (that is, a determination as to whether the MR key 113b or 114b has been pressed for a short period of time). Therefore, in the present embodiment, continuous pressing of the MR key 113b or 114b for a period less than the time T1 (less than a predetermined time) is short-pressing. Continuous pressing of the MR key 113b or 114b for at least the time T1 (at least the predetermined time) is long-pressing. The processing proceeds to S223 when the pressing of the MR key 113b or 114b has been cancelled. Otherwise, the processing proceeds to S221.

In S223, the system control unit 110 changes the setting (setting state; setting content) of the MR according to the short-pressing of the MR key 113b or 114b and records the changed setting on the non-volatile memory 111. For example, when the setting of the MR before detecting the short-pressing in S222 has been normal rotation, the system control unit 110 changes the setting of the MR to horizontal inversion according to the short-pressing. Similarly, when the setting of the MR before the short-pressing has been horizontal inversion, the system control unit 110 changes the setting of the MR to vertical inversion according to the short-pressing. Further, when the setting of the MR before the short-pressing has been vertical inversion, the system control unit 110 changes the setting of the MR to vertical and horizontal inversion according to the short-pressing. Further, when the setting of the MR before the short-pressing has been vertical and horizontal inversion, the system control unit 110 changes the setting of the MR to normal rotation according to the short-pressing.

In S224, the system control unit 110 controls the display-image inversion unit 106, and applies inversion processing to a recording image (image signal; image) that has been output from the recording-image inversion unit 104 according to the setting of the MR (the changed setting in S223). That is, for example, when the setting of the MR is non-inversion (normal rotation), the system control unit 110 performs control so as not to apply inversion processing of the display-image inversion unit 106 to the recording image. Alternatively, in this case, the system control unit 110 performs control so that the recording image is oriented in the direction of normal rotation by the display-image inversion unit 106. Further, for example, when the setting of the MR is horizontal inversion, the system control unit 110 performs control so that the recording image is horizontally inverted by the display-image inversion unit 106. By the application of such control to the recording image, a display image is generated (the direction of the display image is controlled). Then, the system control unit 110 displays the generated display image on the display panel 117.

In S225, the system control unit 110 determines whether a recording image (moving image) is being recorded like S204. The processing proceeds to S226 when a recording image is being recorded. Otherwise, the processing proceeds to S227.

In S226, the system control unit 110 generates an image (hereinafter called a "reference image") oriented in the same direction as when both the settings of the SR and MR are cancelled (non-inversion), and displays the generated image on the display panel 117 as a display image. That is, a reference image displays a subject in a direction in which a user visually recognizes the subject with the naked eye. This processing is performed by the display-image inversion unit 106 without cancelling inversion processing based on the setting of the SR by the recording-image inversion unit 104. More specifically, the display-image inversion unit 106 applies inversion processing to a recording image (photographed image) so as to cancel inversion by the recording-image inversion unit 104, the inversion processing being applied to the recording image according to the setting of the SR by the recording-image inversion unit 104. That is, regardless of the setting of the MR, the system control unit 110 controls the display-image inversion unit 106 in defiance of the setting of the MR, and applies inversion processing to a recording image so as to cancel the inversion by the recording-image inversion unit 104. Thus, with a direction (inversion situation) based on the setting of the SR maintained as a recording image recorded on the recording medium 105, the user can confirm what image is to be displayed when the settings of the SR and MR are not reflected.

Further, the system control unit 110 displays a contraction image (sub-image) generated by the image contraction unit 107 to be superimposed on a display image (main image). By seeing the contraction image (sub-image), the user can confirm the direction of a recording image in which the setting of the SR is reflected.

In S227, the system control unit 110 cancels both the settings of the SR and MR (non-inversion) to generate a reference image. Then, the system control unit 110 causes the generated reference image to be displayed on the display panel 117 as a display image. In this processing, the system control unit 110 cancels inversion processing based on the setting of the SR by the recording-image inversion unit 104 and also cancels inversion processing based on the setting of the MR by the display-image inversion unit 106. That is, both the recording-image inversion unit 104 and the display-image inversion unit 106 perform processing for normal rotation in defiance of the settings of the SR and MR. This is because a recording image is not recorded on the recording medium 105 except during REC unlike S226 and therefore no real damage is caused even if the direction (inversion situation) of the recording image changes.

Further, in S227 as well, the system control unit 110 displays a contraction image (sub-image) generated by the image contraction unit 107 to be superimposed on a display image (main image). Here, the image contraction unit 107 applies not only contraction processing but also inversion processing based on the setting of the SR to the recording image to generate a contraction image. By seeing the contraction image (sub-image), the user can confirm the direction of the recording image in which the setting of the SR is reflected.

Note that the same processing as the processing of S226 may be performed in S227 in consideration of a possibility that a recording image is transmitted to an external recording device or the like and recorded on the external recording device even if the system control unit 110 does not perform management due to recording. That is, the processing of S226 may be performed regardless of whether a recording image is being recorded.

In S228, the system control unit 110 determines whether the pressing (long-pressing) of the MR key 113b or 114b has been cancelled. When the pressing of the MR key 113b or 114b has been cancelled, the system control unit 110 starts a timer to measure a time since the cancellation of the pressing of the MR key 113b or 114b. Further, the processing proceeds to S229 when the pressing of the MR key 113b or 114b has been cancelled. Otherwise, the processing of S228 is repeatedly performed, and the display of S226 or S227 continues.

In S229, the system control unit 110 determines whether the MR key 113b or 114b has been pressed again after the cancellation of the pressing of the MR key 113b or 114b. The processing proceeds to S221 when the MR key 113b or 114b has been pressed again. In S221, the system control unit 110 determines whether the time T1 has elapsed since the pressing of the key. Further, the processing proceeds to S230 when the MR key 113b or 114b has not been pressed again.

In S230, the system control unit 110 determines whether a time T2 has elapsed since the detection of the cancellation of the pressing of the MR key 113b or 114b in S228. The time T2 is, for example, 3 seconds long, and indicates a time at which the user can reliably confirm the display of the reference image in S226 or S227. The processing proceeds to S231 when the time T2 has elapsed. Otherwise, the processing proceeds to S228.

Note that the measurement start time point of T2 may be set at a time point at which the display of the reference image starts in S226 or S227. For example, when the time point at which the display of the reference image starts in S226 or S227 is set as the measurement start time point, the display of the reference image in S226 or S227 continues during the continuation of the pressing of the MR key. Then, when the time T2 has elapsed at a time point at which the release of the MR key is detected in S228, the system control unit 110 ends the display of the reference image in S226 or S227 at the time point (proceeds to S231). On the other hand, when the time T2 has not elapsed at the time point at which the release of the MR key is detected in S228, the system control unit 110 ends the display of the reference image in S226 or S227 after the elapse of the time T2.

In S231, the system control unit 110 generates a display image in a case where the setting of SR is reflected and the setting of the MR is cancelled (normal rotation), and displays the generated display image on the display panel 117. This processing is performed by displaying a recording image (photographed image) which performed inversion processing according to the setting of the SR being applied to the recording image by the recording-image inversion unit 104, without inversion by the display-image inversion unit 106.

Further, the system control unit 110 displays the image that has been contracted by the image contraction unit 107 on the display panel 117. That is, the system control unit 110 generates a display image to which inversion by the display-image inversion unit 106 has not been applied with respect to the recording image (photographed image) to which the inversion processing according to the setting of the SR has been applied by the recording-image inversion unit 104. Then, the system control unit 110 controls the superimposing processing unit 108 to superimpose the contraction image (sub-image) that has been generated by the image contraction unit 107 on the display image (main image), and then displays the display image on which the contraction image has been superimposed on the display panel 117. Note that the contraction image may not be displayed in this case since the display image and the contraction image are images oriented in the same direction.

In S232, the system control unit 110 determines whether the MR key 113b or 114b has been pressed. The processing proceeds to S221 when the MR key 113b or 114b has been pressed. Otherwise, the processing proceeds to S233.

In S233, the system control unit 110 determines whether a time T3 has elapsed since the start of displaying the image in S231. The time T3 is, for example, 3 seconds long, and indicates a time at which the user can reliably confirm the display of the image in S231. The processing proceeds to S234 when the time T3 has elapsed. Otherwise, the processing returns to S232.

In S234, the system control unit 110 performs image processing in which the settings of the SR and MR are reflected like S202. Therefore, if the MR key 113b or 114b is pressed for a long period of time and then the combined time of the time T2 and the time T3 elapses after the pressing is cancelled, an ordinary display image in which the settings of the SR and MR are reflected is displayed. That is, since the reference image or an image in which only the setting of the SR is reflected is displayed for only a short period of time, photographing by the user is not easily hindered. Further, since the reference image or like is not displayed unless the MR key 113b or 114b is pressed for a long period of time, photographing by the user is not easily hindered.

In S240, the system control unit 110 determines whether the REC key 113a or 114a has been pressed. The processing proceeds to S241 when the REC key 113a or 114a has been pressed. Otherwise, the processing proceeds to S244.

In S241, the system control unit 110 determines whether a recording image is being recorded like S204. The processing proceeds to S243 when a recording image is being recorded. Otherwise, the processing proceeds to S242.

In S242, the system control unit 110 starts recording processing to record the recording image that has been output from the digital-signal processing unit 102 (the recording-image inversion unit 104) on the recording medium 105 as an image file (moving-image file).

In S243, the system control unit 110 stops the recording processing on the recording medium 105, performs processing to close the image file (moving-image file), and returns to a photographing standby state.

In S244, the system control unit 110 determines whether an ending event to end the photographing-mode processing has been performed. The processing returns to S202 when the ending event has not been performed. Otherwise, the processing of FIG. 2 ends. The ending event includes, for example, power-off, transition to another mode such as a reproduction mode, removal of a battery, and a reduction in battery voltage.

[About Display Examples]

Using FIGS. 3A to 3E, display examples of the display panel 117 in the above respective processing of FIG. 2 will be described.

Figure 3A:
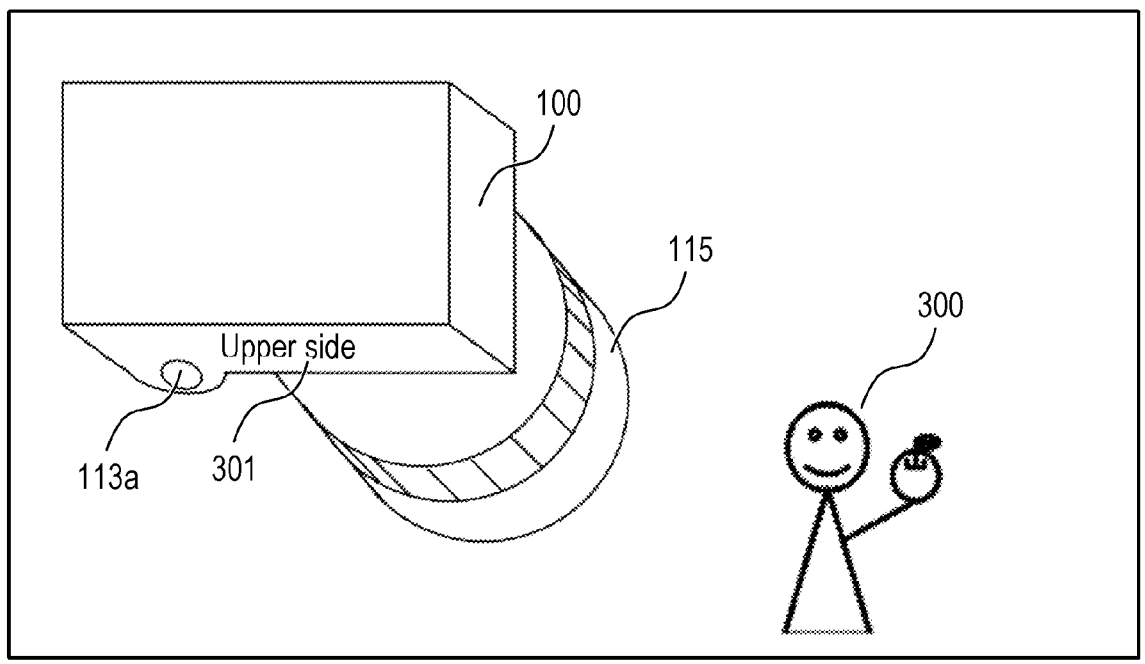
FIGS. 3A to 3E are diagrams showing display examples of a display unit according to the first embodiment.

FIG. 3A is a view showing a photographing situation in a case where photographing is performed with the imaging device (camera) turned upside down. The body unit 100 of the imaging device is installed on a ceiling or the like in its inverted posture. Further, an upper surface 301 of the body unit 100 is oriented in a gravity direction (downward). In FIG. 3A, the upper surface 301 is expressed by characters "Upper side" for clarity. Note that the lens unit 115 is oriented to the side of a subject 300, and the subject 300 is being photographed.

Figure 3B:
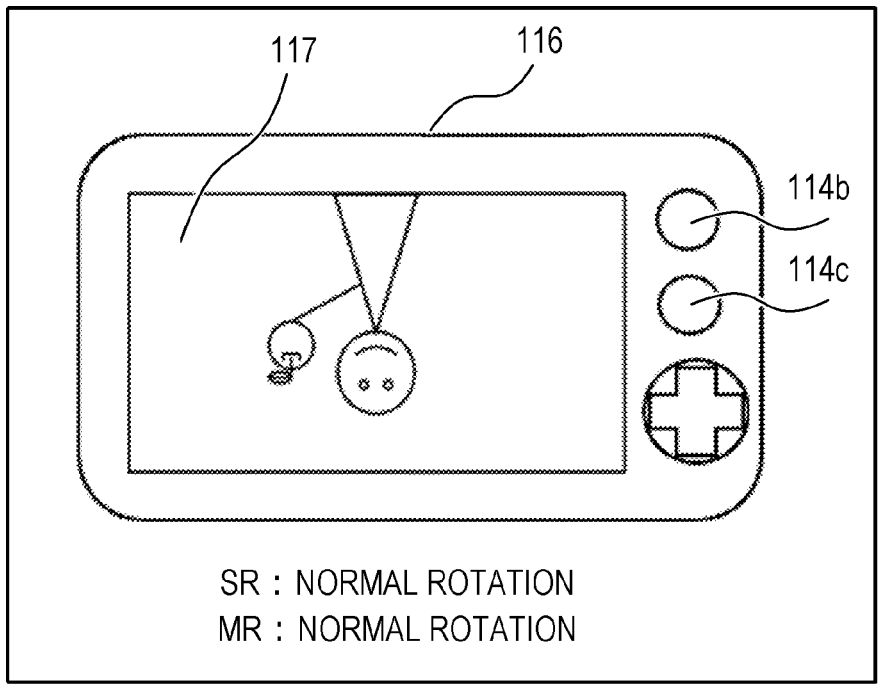

FIG. 3B shows a display example of an LV image on the display panel 117 in a case where both the SR and MR are set to non-inversion (normal rotation) and the display unit 116 is set at a normal position (with the upper side oriented upward) in the photographing situation of FIG. 3A. Since photographing is performed with the imaging device turned upside down, the LV image to which inversion processing has not been applied is also displayed upside down. For example, in S202, the LV image is displayed as shown in FIG. 3B in a state where both the SR and MR are set to non-inversion (normal rotation) in the photographing situation shown in FIG. 3A.

Figure 3C:
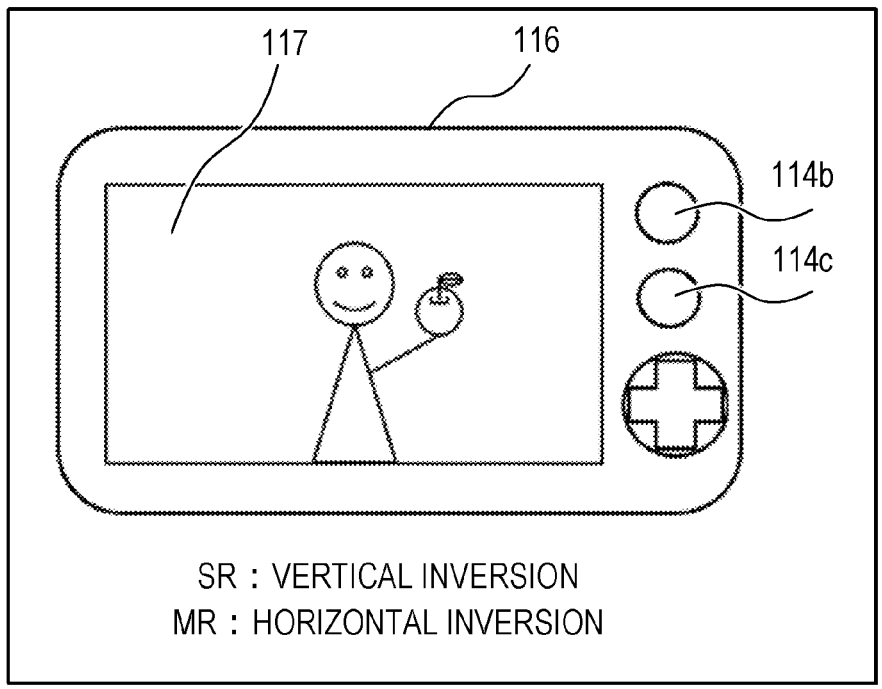

FIG. 3C shows a display example of an LV image on the display panel 117 in a case where the setting of the SR is set to vertical inversion, the setting of the MR is set to horizontal inversion, and the display unit 116 is set at the normal position (with the upper side directed upward) in the photographing situation of FIG. 3A. For example, it is assumed that the system control unit 110 sets the SR to vertical inversion through the processing of S203 to S209 and further sets the MR to horizontal inversion through the processing of S220 to S223 according to the short-pressing of the MR key after displaying the LV image as shown in FIG. 3B in S202. As a result, the LV image as shown in FIG. 3C is displayed in S224. Since the LV image displayed on the display panel 117 shown in FIG. 3C is displayed in the same direction as the actual state of the subject 300 shown in FIG. 3A, the user can easily see the LV image.

Figure 3D:
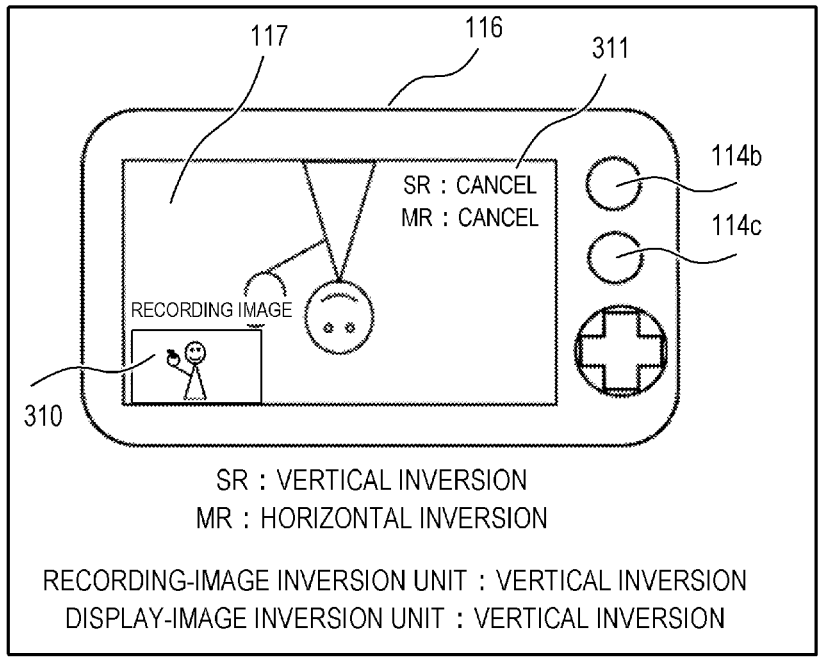

FIG. 3D shows a display example of the display panel 117 in S226 in a case where the MR key 113b or 114b is pressed for a long period of time during REC in the photographing situation of FIG. 3A. A display image displayed as the background of the display panel 117 is oriented in the same direction (in the same vertical and horizontal relationship) as the image shown in FIG. 3B in a case where both the SR and MR are set to normal rotation. However, before the display of the image shown in FIG. 3D, the recording-image inversion unit 104 performs the processing of vertical inversion (without normal rotation) to reflect the setting of the vertical inversion of the SR. Further, the display-image inversion unit 106 also performs the processing of vertical inversion to cancel the vertical inversion of the recording-image inversion unit 104. As a result, the display panel 117 displays the display image oriented in the same direction as when both the SR and MR are cancelled (normal rotation).

Further, FIG. 3D displays, together with the display image, character strings (guides) 311 that are display items showing confirmation display for an image in a case where both the SR and MR are cancelled. Thus, the user can understand what the display image shows (more specifically, the display image in which the settings of the SR and MR are not reflected but are temporarily cancelled).

In addition, in FIG. 3D, the display panel 117 displays a contraction image 310 (sub-image) obtained by contracting a recording image by the image contraction unit 107 so that the contraction image 310 (sub-image) is superimposed on the display image, the recording image being vertically inverted by the recording-image inversion unit 104 with the reflection of the setting of the SR. By seeing the contraction image 310, the user can confirm whether an image directed as intended is being recorded. Note that the display panel 117 displays, for example, a character string (guide) such as a "recording image" showing the fact that the contraction image 310 is an image obtained by contracting the recording image (image to be recorded on the recording medium 105). Thus, the user can understand what the contraction image 310 shows. Note that display (for example, display of "SR: vertical inversion") showing the state of the setting of the SR may be performed in addition to the character string such as "recording image."

Figure 3E:
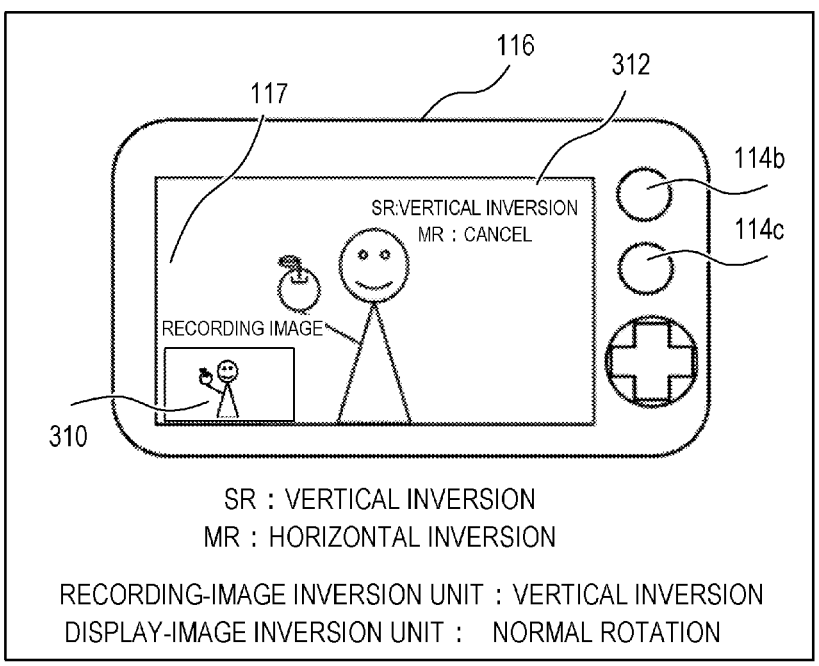

FIG. 3E shows a display example of the display panel 117 in S231 in the photographing situation of FIG. 3A. A display image displayed as the background of the display panel 117 is an image in which only the setting of the SR is reflected. Thus, the user can confirm whether an image directed as intended is being recorded. Further, the display panel 117 displays, together with the display image, character strings (guides) 312 that are confirmation display for an image in a case where the setting of the SR is reflected and the setting of the MR is cancelled. Thus, the user can understand what the display image shows (more specifically, the display image in which the setting of the SR is reflected and the setting of the MR is temporarily cancelled).

Further, the display panel 117 displays a contraction image 310 (sub-image) generated in the same manner as FIG. 3D so that the contraction image 310 (sub-image) is superimposed on the display image. Note that the display image displayed in FIG. 3E is oriented in the same direction as the contraction image 310. Accordingly, the system control unit 110 may perform control so as not to display the contraction image 310 in a superimposed state in any of S226, S227, and S231. This is because the user can confirm whether the recording image is directed as intended through the display image in S231 even under the control. Further, the system control unit 110 may display the contraction image 310 in a superimposed state in S226 or S227 and proceed from S230 to S234 without performing the processing of S231. This is because the user can confirm whether the recording image is directed as intended by seeing the contraction image displayed in S226 or S227.

As described above, the imaging device according to the present embodiment switches display in S226 from image display in which the settings of the SR and MR are reflected. Thus, the user can confirm what inversion has been performed by the settings of the SR and MR without affecting a recording image.

Note that the present embodiment describes an example in which the display as in S226 is triggered by pressing the MR key for a long period of time (a second operation on an operation member that provides instructions to invert a display image). If confirmation display as in S226 is possible by the operation, the user is only required to operate the same operation member (MR key) when performing a setting change (a change in the setting of the MR or confirmation display) relating to inversion. The user easily memorizes an operation since the operation is intuitive and easy.

Note that the display as in S226 may not be triggered only by the long-pressing of the MR key for a long period of time described above but may triggered by performing an operation on another operation member. The confirmation of an inversion setting may be triggered by at least one of instructions to start REC through the pressing of the REC key 113a or 114a, a change in the setting of the SR or the setting of the MR, and detection of a change in the posture of the body unit 100.

When the confirmation of an inversion setting is triggered by instructions to start REC, the user can confirm whether the settings of the SR and MR have been desired settings at the start of REC and suppress waste moving-image recording when the desired settings have not been provided. When the confirmation is triggered by the setting of the SR or the setting of the MR, the user can confirm whether the settings of the SR and MR have been desired settings at the time of changing the setting of the SR or the setting of the MR.

In addition, when the confirmation of the inversion setting is triggered by the detection of a change in the posture of the body unit 100, the detection of the body unit 100 from the normal posture (ordinary posture) to the inverted posture of the body unit 100 or from the inverted posture to the normal posture of the body unit 100 is used as a trigger. Thus, the user can confirm whether the settings of the SR and MR corresponding to the current posture of the body unit 100 have been set. Note that the confirmation of the inversion setting may be triggered by the detection of the body unit 100 from a normal posture to a vertical posture, the detection of the body unit 100 from a vertical posture to an inverted posture, the detection of the body unit 100 from an inverted posture to a vertical posture, and/or the detection of the body unit 100 from a vertical posture to a normal posture.

Further, in addition to or instead of the display of S226, S227, and S231, an image in which the setting of the SR is cancelled and the setting of the MR is reflected may be generated and displayed only by the processing of the display-image inversion unit 106. In this case, the recording-image inversion unit 104 performs vertical inversion according to the setting of the SR, and the display-image inversion unit 106 performs vertical and horizontal inversion if the SR is set to the vertical inversion and the MR is set to horizontal inversion. That is, the display-image inversion unit 106 controls the direction of a recording image and generates a display image so that an image is oriented in the same direction as when the setting of the MR is reflected in a reference image (image signal output from the image processing unit 103). Thus, a vertically-inverted image in which only the setting of the SR is cancelled and the setting of the MR is reflected can be generated.

Second Embodiment

A second embodiment will describe an example in which a display item different from a LV image (captured image) is displayed to notify a user of the settings (setting states) of the SR and MR so as to be easily understood.

The configurations of the imaging device (image processing device) according to the second embodiment are the same as the configurations shown in FIG. 1 described above. Therefore, the descriptions of the configurations of the respective units of the imaging device according to the second embodiment will be omitted.

Further, in photographing-mode processing by the imaging device according to the second embodiment as well, the same processing as processing of S201 to S224 and the processing of S240 to S244 of FIG. 2 is performed similarly, and therefore the descriptions of the processing will be omitted. Only portions different from the first embodiment will be described using the flowcharts of FIGS. 2 and 4A. Specifically, in the photographing-mode processing according to the second embodiment, the processing of S225 to S234 of the photographing-mode processing (see FIG. 2) according to the first embodiment is deleted, and the processing of S401 to S403 is added.

First, when it is determined that the MR key has been pressed for a long period of time in S221 of FIG. 2, the processing proceeds to S401 of FIG. 4A in the second embodiment.

In S401, the system control unit 110 displays setting information (see FIG. 4B to 4D) showing the respective states (setting states) of the settings of the SR and MR at the same time and at different (separate) positions on the display panel 117. More specifically, the superimposing processing unit 108 superimposes (combines) a display item serving as setting information on (with) a display image (photographed image; image) that has been processed by the display-image inversion unit 106. Then, when the display image on which the display item has been superimposed is output from the superimposing processing unit 108 to the display unit 116, the display image is displayed on the display panel 117. Note that in S401, the system control unit 110 may display, together with setting information, a contraction image 310 showing a recording image in which only the setting of the SR is reflected like the first embodiment.

In S402, the system control unit 110 determines whether the pressing of the MR key 113b or 114b has been cancelled. The processing proceeds to S403 when the pressing of the MR key 113b or 114b has been cancelled. Otherwise, the processing of S402 is repeatedly performed.

In S403, the system control unit 110 hides the setting information (setting information showing the respective states of the settings of the SR and MR) displayed in S401. Thus, the system control unit 110 performs control so that only a display image (photographed image) in which the settings of the SR and MR are reflected by the recording-image inversion unit 104 and the display-image inversion unit 106 is displayed on the display panel 117. When the processing of S403 ends, the processing proceeds to S240. Therefore, since the setting information is immediately hidden when the pressing (long-pressing) of the MR key 113b or 114b is cancelled, the display of the setting information does not hinder photographing by a user. Further, photographing by the user is facilitated by hiding the setting information unless the MR key 113b or 114b is pressed for a long period of time.

[Display Examples of Display Item]

Hereinafter, display examples of a display item serving as examples of the setting information displayed in S401 will be described with reference to FIGS. 4B to 4D.

Figure 4B:
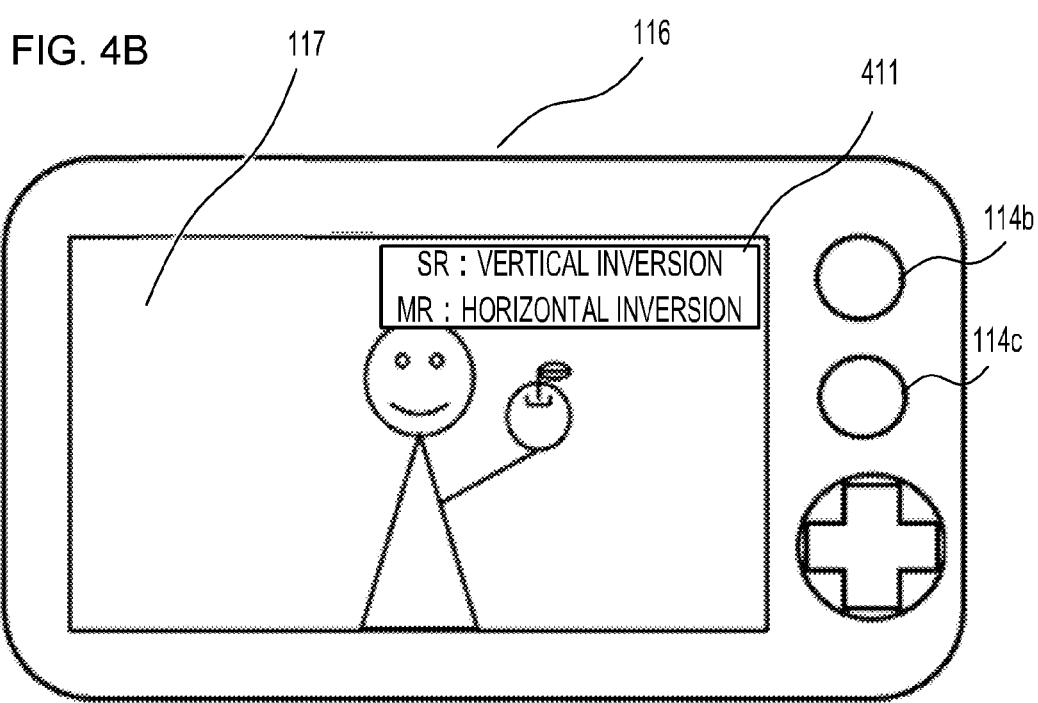

FIG. 4B shows a display example of a display item 411 displayed in S401. The display item 411 displays the respective current states (setting states) of the settings of the SR and MR at the same time and at different positions using character strings. Here, a displayed LV image is one reflecting the settings of the SR and MR in combination. Therefore, a user has a difficulty in understanding the settings of the SR and MR only by seeing the LV image. In order to deal with the problem, the current state of the setting of the SR and the current state of the setting of the MR are displayed at the same time and at different (separate) positions using the display item 411. Therefore, the user can intuitively understand the respective settings.

Figure 4C:
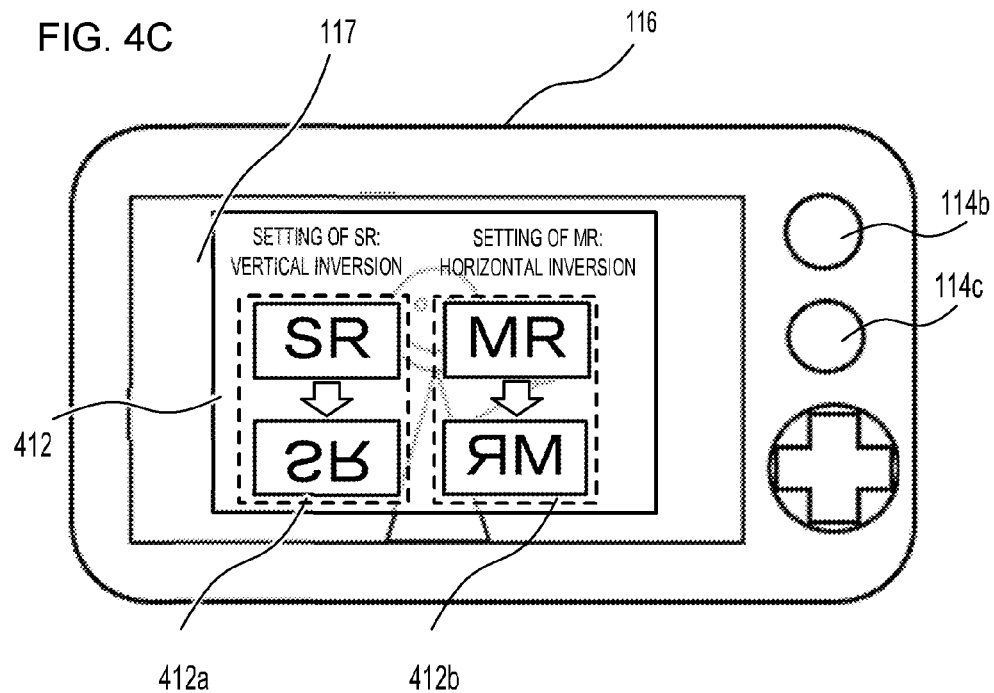
Figure 4D:
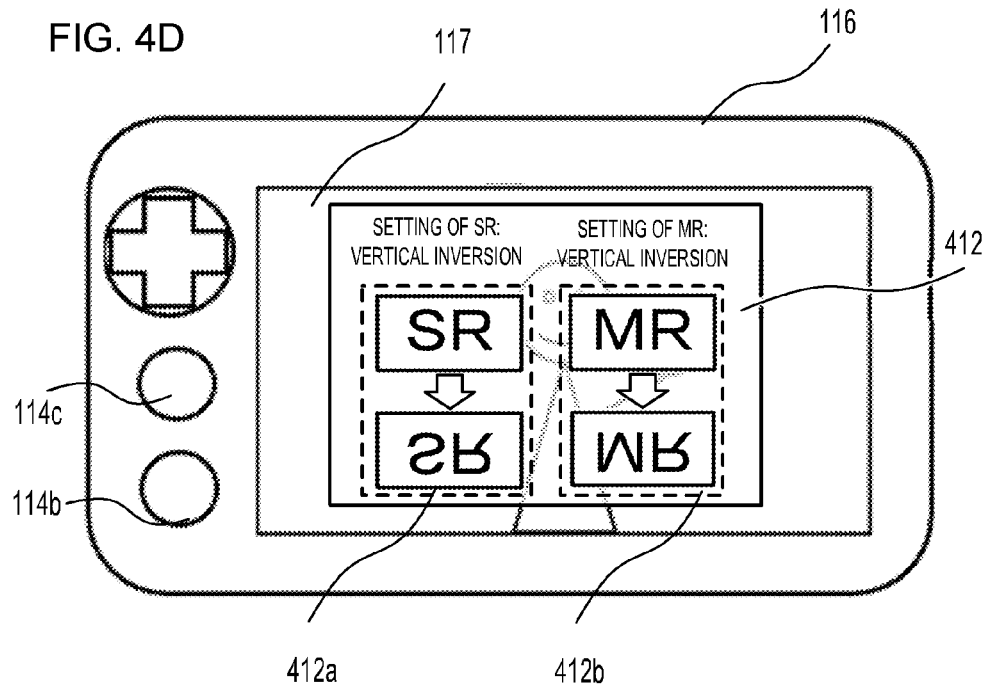

FIG. 4C shows a display example of a display item 412 displayed in S401. The display item 412 separately displays the respective settings of the SR and MR using icons (motifs). A left display element 412a shows the state of the setting of the SR. A right display element 412b shows the state of the setting of the MR.

Of the display element 412a, the upper side displays the motif (icon) of the normal image of the "SR" corresponding to a case where the setting of the SR is not reflected, and the lower side displays the motif of the vertically-inverted image of the "SR" corresponding to post-processing where the setting of the SR is reflected. The motifs are not limited to the character strings of the "SR" but are preferably horizontally-asymmetrical or/and vertically-asymmetrical designs (shapes) so as to make an inverted situation visually understandable. As described above, the motif (upper side) showing a state before the application of inversion processing by the setting of the SR and the motif (lower side) showing the result of the inversion processing are displayed in association with each other. By such display, the user can visually and easily understand what inversion processing is to be applied with the current setting of the SR.

As for the display element 412b, the upper side displays the motif (icon) of the normal image of the "MR" corresponding to a case where the setting of the MR is not reflected, and the lower side displays the motif of the vertically-inverted image of the "MR" corresponding to post-processing where the setting of the MR is reflected. Similarly, the motifs are not limited to the character strings of the "MR" but are preferably horizontally-asymmetrical and vertically-asymmetrical designs (shapes). By such display, the user can visually and easily understand what inversion processing is to be applied with the current setting of the MR. Note that character strings showing the respective states (setting states) of the settings of the SR and MR are displayed at the upper parts of the respective motifs of the display item 412 to make the setting states more easily understood. However, the display of the setting states by the character strings may not be displayed.

Note that the system control unit 110 may control the direction of an entire display item depending on whether the setting of the MR includes vertical inversion. Specifically, when the setting of the MR is vertical inversion or vertical and horizontal inversion, the system control unit 110 may vertically and horizontally (180-degree rotation) invert the entire display direction of various display items as well as a photographed image from a normal direction. The same applies to the first embodiment. FIG. 4D shows a display example of the states (setting states) of the settings of the SR and MR when the setting of the MR is set to vertical inversion. The posture (direction) of the display unit 116 in FIG. 4D is vertically and horizontally inverted in comparison with FIG. 4C. The setting of the MR is vertical inversion. Therefore, the display item 412 is entirely displayed in a vertically and horizontally inverted direction (180-degree rotation) in comparison with FIG. 4C, and displayed in a direction in which the user can easily see the display item 412. Further, in the vertically-and-horizontally inverted display item 412, the lower motif of the display element 412b is also the motif of the vertically-inverted image of the "MR" so as to show the vertical inversion of the setting of the MR.

As for the display of the setting states using the above motifs (icons), icon display may be performed using a motif RI showing the abbreviation of record inverse instead of the motif SR as an example of using another motif. Similarly, icon display may be performed using a motif PI showing the abbreviation of panel inverse instead of the motif MR.

The start of displaying the states (setting states) of the settings (setting-state display) of the SR and MR in the second embodiment described above is triggered by pressing the MR key for a long period of time for the same reason as the first embodiment. Like the first embodiment, the start of the setting-state display in the second embodiment may not be triggered only by pressing the MR key for a long period of time described above but may be triggered by performing an operation on another operation member. Further, for the same reason as the first embodiment, the start of the setting-state display in the second embodiment may be triggered by at least one of instructions to start REC, a change in the setting of the SR or the setting of the MR, and detection of a change in the posture of the body unit 100.

Further, the setting-state display (processing in S401) using the display item in the second embodiment described above may be performed in combination with the display of the image (processing in S226) equivalent to the case where the settings of the SR and MR are cancelled as described in the first embodiment. For example, at the timing of S226 shown in FIG. 2, the system control unit 110 may display the setting states using the display item described in the second embodiment, while displaying the image equivalent to the case where the settings of the SR and MR are cancelled as described in the first embodiment.

Further, the setting-state display (processing in S401) using the display item and the display of the image (processing in S226) equivalent to the case where the settings of the SR and MR are cancelled as described in the first embodiment may be used for each purpose in response to a trigger (condition). For example, the system control unit 110 performs the setting-state display using the display item described in the second embodiment according to a change in the state (setting state; setting content) of the setting of the SR or the setting of the MR. Then, when the MR key is pressed for a long period of time, the system control unit 110 may display the image equivalent to the case where the settings of the SR and MR are cancelled as described in the first embodiment.

Further, the above descriptions refer to the examples in which any of normal rotation, horizontal inversion, vertical inversion, and vertical and horizontal inversion is set to the SR and MR. However, in addition to or instead of these rotation, the imaging device may set rotation at any angle such as 90-degree rotation and 270-degree rotation to the SR and MR. In this case, the recording-image inversion unit 104 and the display-image inversion unit 106 perform processing to rotate an input image (image signal; image). In this case, for example, in S226, the system control unit 110 generates a reference image by controlling the display-image inversion unit 106 so that rotation processing to cancel rotation processing by the recording-image inversion unit 104.

Note that the various control described above as being performed by the system control unit 110 may be performed by one hardware or a plurality of hardware (for example, a plurality of processors or circuits) may share processing to control the entire device.

Further, the present invention is described in detail above on the basis of its preferred embodiments. However, the present invention is not limited to these specific embodiments but includes various other embodiments without departing from its gist. In addition, each of the embodiments described above shows only an embodiment of the present invention, and the embodiments may be appropriately combined together.

Further, the embodiments described above exemplify the case where the present invention is applied to the imaging device. However, the present invention is not limited to the example but is applicable to an image processing device in which both inversion of a recording image and inversion of a display image can be set. The present invention is applicable to a case where images or the like received from TV lines, networks, or connection-destination equipment besides photographed images are recorded as recording images. That is, the present invention is applicable to personal computers, PDAs, mobile telephone terminals, mobile image viewers, game machines, TV sets, hard disk recorders, set top boxes, or the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing device comprising at least one memory and at least one processor which function as:
   a recording-image inversion unit configured to perform rotation or inversion processing on a first image to generate a second image for recording according to a first setting that is a setting of rotation or inversion processing for image recording; and
   a display-image inversion unit configured to perform rotation or inversion processing on the second image generated by the recording-image inversion unit to generate a third image for display according to a second setting that is a setting of rotation or inversion processing for image display;
   a control unit configured to:
   1) control a display unit to display the third image, and
   2) control the display-image inversion unit to perform rotation or inversion processing on the second image generated by the recording-image inversion unit so that the rotation or inversion processing by the recording-image inversion unit is cancelled and to generate a fourth image for display, and control the display unit to display the fourth image, in response to a first trigger regardless of the second setting.

2. The image processing device according to claim 1, wherein, after displaying the fourth image on the display unit in response to the first trigger,
   the control unit controls the display unit to display the second image without performing processing of either rotation or inversion with the display-image inversion unit in response to a second trigger regardless of the second setting.

3. The image processing device according to claim 1, wherein, after displaying the fourth image on the display unit in response to the first trigger,
   the control unit controls the display unit to display an image obtained by performing rotation or inversion processing on the second image by the display-image inversion unit in a same direction as the rotation or inversion processing performed on the first image according to the second setting in response to a third trigger.

4. The image processing device according to claim 1, wherein
   the control unit performs control to record the second image on a recording unit in a predetermined operation mode.

5. The image processing device according to claim 4, wherein, in a mode other than the predetermined operation mode,
   the control unit controls the display unit to display the first image without performing either rotation or inversion processing by the recording-image inversion unit and the display-image inversion unit in response to the first trigger.

6. The image processing device according to claim 1, wherein
   the control unit further controls the display unit to display a display item showing the first setting and the second setting in response to the first trigger.

7. The image processing device according to claim 1, wherein
   the control unit controls the display unit to display a contraction image obtained by contracting the second image so that the contraction image is superimposed on the fourth image in response to the first trigger.

8. The image processing device according to claim 7, wherein
   the control unit controls the display unit to display, together with the contraction image, a fact that the contraction image is an image to be recorded on a recording unit.

9. The image processing device according to claim 1, wherein
   the first trigger represents continuous pressing of a predetermined operation member for at least a predetermined time, and
   the control unit changes the second setting in a case where continuous pressing of the predetermined operation member performed for a time less than the predetermined time.

10. The image processing device according to claim 1, wherein
    the control unit controls the display unit to display a display item showing the first setting and the second setting at a same time and at different positions in response to a fourth trigger.

11. The image processing device according to claim 10, wherein
    the display item shows the first setting and the second setting by characters.

12. The image processing device according to claim 10, wherein
    the display item includes a first display element showing the first setting by a first motif and a second display element showing the second setting by a second motif.

13. The image processing device according to claim 12, wherein
    the first display element includes the first motif and a motif obtained by performing rotation or inversion processing on the first motif according to the first setting.

14. The image processing device according to claim 12, wherein
    the second display element includes the second motif and a motif obtained by performing rotation or inversion processing on the second motif according to the second setting.

15. The image processing device according to claim 12, wherein each of the first motif and the second motif is horizontally-asymmetrical and/or vertically-asymmetrical motifs.

16. The image processing device according to claim 10, wherein
the control unit controls to perform rotation or inversion processing on the entire display item to a direction corresponding to whether the second setting includes a setting for vertical inversion in response to the fourth trigger.

17. The image processing device according to claim 16, wherein, in response to the fourth trigger,
the control unit
controls the display unit to display the display item in a predetermined direction in a case where the second setting is a setting for normal rotation or a setting for horizontal inversion, and
controls the display unit to display the display item in a direction in which the display item is vertically and horizontally inverted from the predetermined direction in a case where the second setting is a setting for vertical inversion or a setting for vertical and horizontal inversion.

18. The image processing device according to claim 10, wherein
the control unit controls the display unit not to display the display item in a case where the fourth trigger does not occur.

19. The image processing device according to claim 10, wherein
the control unit controls the display unit not to display the display item in a case where the fourth trigger is cancelled.

20. The image processing device according to claim 10, wherein the fourth trigger is same as the first trigger.

21. A method for controlling an image processing device, comprising:
a recording-image inversion step of performing rotation or inversion processing on a first image according to a first setting that is a setting of rotation or inversion to generate a second image;
a display-image inversion step of performing rotation or inversion processing on the second image according to a second setting that is a setting of rotation or inversion processing for image display to generate a third image; and
a control step of:
 1) controlling a display unit to display the third image, and
 2) performing rotation or inversion processing on the second image generated by the recording-image inversion step so that the rotation or inversion processing by the recording-image inversion step is cancelled and generating a fourth image for display, and controlling the display unit to display the fourth image, in response to a first trigger regardless of the second setting.

22. A non-transitory computer readable medium that stores a program, wherein the program causes a computer to execute a method for controlling an image processing device,
wherein the method comprising:
a recording-image inversion step of performing rotation or inversion processing on a first image according to a first setting that is a setting of rotation or inversion to generate a second image;
a display-image inversion step of performing rotation or inversion processing on the second image according to a second setting that is a setting of rotation or inversion processing for image display to generate a third image; and
a control step of:
 1) controlling a display unit to display the third image, and
 2) performing rotation or inversion processing on the second image generated by the recording-image inversion step so that the rotation or inversion processing by the recording-image inversion step is cancelled and generating a fourth image for display, and controlling the display unit to display the fourth image, in response to a first trigger regardless of the second setting.

* * * * *